United States Patent
Mangal et al.

(10) Patent No.: US 7,715,397 B2
(45) Date of Patent: May 11, 2010

(54) DATA COMMUNICATIONS METHOD AND STRUCTURE

(75) Inventors: Manish Mangal, Overland Park, KS (US); Fred C. Rogers, Olathe, KS (US); Jeremy R. Breau, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 700 days.

(21) Appl. No.: 11/534,066

(22) Filed: Sep. 21, 2006

(65) Prior Publication Data

US 2008/0075081 A1 Mar. 27, 2008

(51) Int. Cl.
*H04L 12/28* (2006.01)
*H04J 3/16* (2006.01)
*H04J 3/24* (2006.01)

(52) U.S. Cl. ............... 370/392; 370/469; 370/471; 370/472; 370/474

(58) Field of Classification Search ............... None
See application file for complete search history.

(56) References Cited

U.S. PATENT DOCUMENTS

| | | | |
|---|---|---|---|
| 5,588,009 A * | 12/1996 | Will ........................... | 714/749 |
| 7,058,751 B2 | 6/2006 | Kawarai et al. ........... | 710/28 |
| 7,058,789 B2 | 6/2006 | Henderson et al. ......... | 370/392 |
| 2002/0013135 A1 | 1/2002 | Proctor, Jr. ............... | 455/466 |
| 2004/0199660 A1* | 10/2004 | Liu ............................. | 709/236 |
| 2006/0262788 A1* | 11/2006 | Johnson et al. ............. | 370/389 |

OTHER PUBLICATIONS

"Session Initiation Protocol (SIP Tutorial: SIP to ISDN Q.931 Call Flow (Brief))", Jun. 2005, EventHelix.com/EvenStudio 2.5, p. 1-6.*
PCT International Search Report.

\* cited by examiner

*Primary Examiner*—Daniel J Ryman
*Assistant Examiner*—Thinh D Tran

(57) ABSTRACT

An embodiment of a method, system, and structure communicating messaging data in a header of a packet are provided. The data structure includes a data packet comprising a header and a payload, wherein part of the header includes first and second data portions, wherein the first data portion indicates a type of message encoded in the second data portion, and wherein the second data portion includes message data. An embodiment of a method includes encoding a communications message, which would otherwise be inclusive in a payload portion of a packet into a portion of a header of a packet, encoding an indication that indicates a type of messaging that said messaging is, and facilitating the communication of the packet to a destination.

4 Claims, 4 Drawing Sheets

DATA COMMUNICATIONS METHOD AND STRUCTURE

BACKGROUND

Sending data in packets is one way to communicate information. Generally, packets have included a header portion and a payload portion. Historically, these portions separate header information from payload information. But the current state of the art could be improved by including payload-type information (e.g., messaging information) in a portion of a packet header.

SUMMARY

The present invention is defined by the claims below, not this summary. Embodiments of the present invention provide a system, method, and product for, among other things, placing messaging information into a packet header, and interpreting the same. The present invention has several practical applications in the technical arts, including utilizing a portion of a header to contain a first portion that contains information to describe a specific type of messaging and a second portion that contains the messaging data. In some embodiments, an index or message dictionary can be used to decode one or both of the above.

In a first aspect, a data structure embodied on one or more tangible computer-readable media is provided that includes a data packet comprising a header and a payload, wherein part of the header includes first and second data portions, wherein the first data portion indicates a type of a specific type of messaging (such as a protocol of a message) encoded in the second data portion, and further wherein the second data portion includes message data.

In a second aspect, a method for conveying information is provided, including encoding a communications message, which would otherwise be inclusive in a payload portion of a packet into a portion of a header of a packet, encoding an indication that indicates a type of messaging that said messaging is, and facilitating the communication of the packet to a destination.

In a third illustrative aspect, a computer-program product facilitates providing a data packet that includes a header portion but not a payload portion outside of the header portion, encoding in an area of the header portion data that would otherwise have been included in the payload portion had the payload portion been included, encoding in the header portion a protocol indicator that indicates a protocol to be associated with the data, and communicating the data packet to a target destination.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide, among other things, as defined by the claims below, a way to communicate data that includes embedding messaging data into the header of a packet instead of the payload portion. Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a data structure or computer-program product that includes computer-useable instructions embodied on one or more computer-readable media.

Computer-readable media include both volatile and nonvolatile media, removable and nonremovable media, and contemplates media readable by a database, a computer, and various other network devices. By way of example, and not limitation, computer-readable media include computer-storage media.

Computer-storage media, or machine-readable media, include media implemented in any method or technology for storing information. Computer-storage media is nontransitory in nature even though it may store transitory data, Examples of stored information include computer-useable instructions, data structures, program modules, and other data representations. Computer-storage media include but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Figure 1:
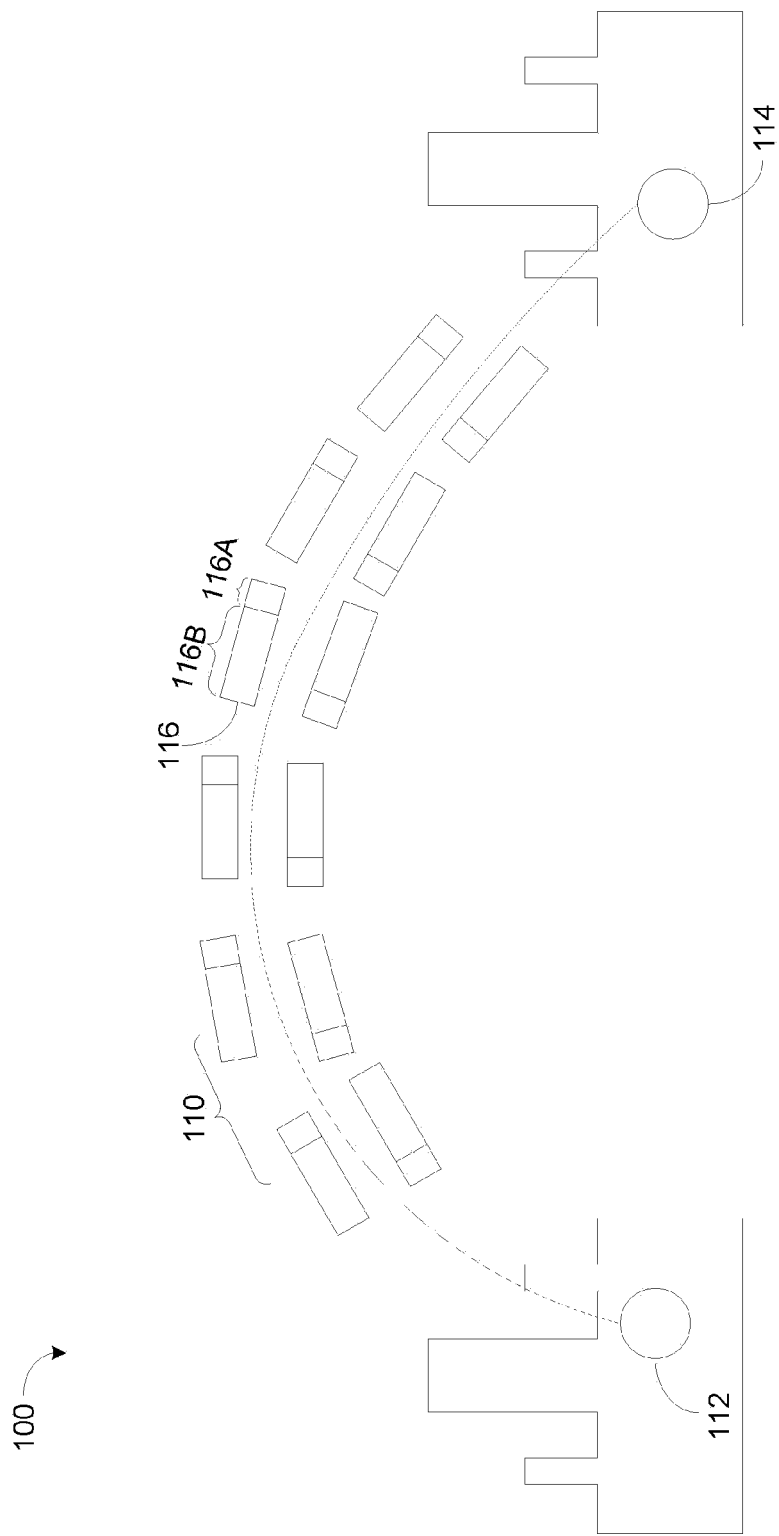
FIG. 1 depicts an illustrative method of communicating packets.

Turning now to FIG. 1, an illustrative operating environment suitable for practicing an embodiment of the present invention is provided and is referenced generally by the numeral 100. A number of packets 110 communicate data from a first device 112 (e.g., a sending device) to a second device 114 (e.g., a receiving device) and vice versa. An illustrative packet 116 includes a header portion 116A and a payload portion 116B, to the extent there is a payload portion. As will be explained, a payload portion is not required, but can be included to replicate header-embedded message data or to supplement it. Sending device 112 may send traditional packets, such as those shown by reference numeral 110 to receiving device 114, which can also send other packets back to 112, which can receive packets sent by receiving device 114.

Packet-based communications can be accomplished using a variety of protocols. For example, illustrative protocols include SIP (Session Initiated Protocol), which works with IP (Internet Protocol), as well as QSP, HTTP, and a litany of others. Historically, what has been common to each of these protocols is, as mentioned, each packet typically has included a header portion and a payload portion. We will explain an alternative form of communication by explaining in greater detail the aspects of a packet as shown in FIG. 2.

Figure 2:
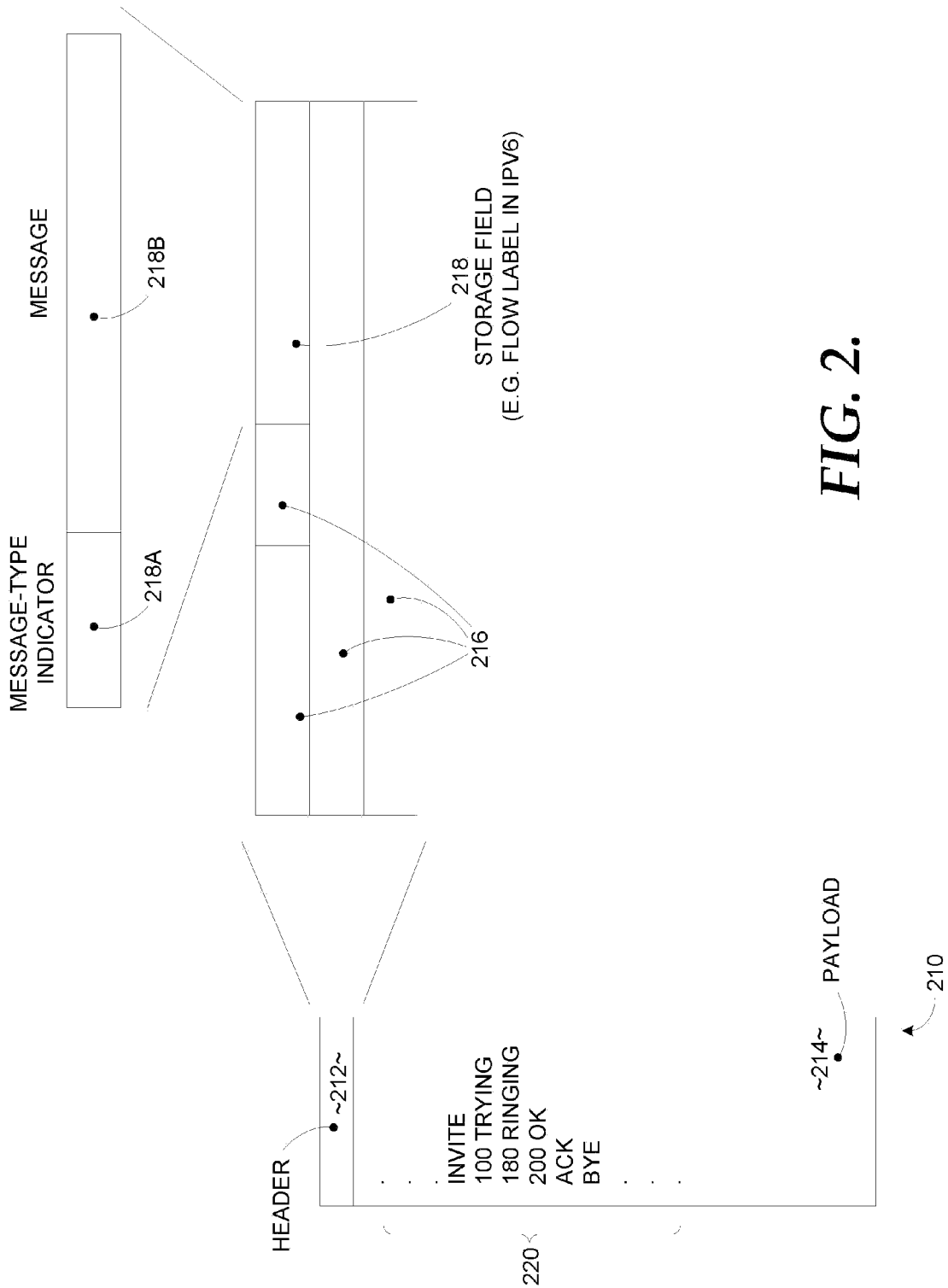
FIG. 2 depicts an illustrative data structure according to an embodiment of the present invention.

Turning now to FIG. 2, an illustrative packet 210 is shown that includes a header portion 212 as well as a payload portion 214. But according to an embodiment of the invention, header portion 212, which may include a variety of fields 216 (such as a source field and a destination field) as well as an available field 218 that, according to an embodiment of the present invention, can be used to store what has historically been communicated as payload data. That is, field 218, in header portion 212, can be used to encode payload data, such as that illustratively shown by reference numeral 220. Illustrative payload data includes various messages. Illustrative messages are shown of the sort consistent with SIP, such as "Invite," "100 trying," "180 ringing," "200 Okay," "ACK," "BYE," and many others as shown by the ellipses. Of course, the signaling messages could be those of various protocols. The signaling messages 220 shown are purely illustrative in nature and could take on a variety of forms according to the various protocol that the payload is encoded into.

As mentioned, field 218, rather than just including routing information, can serve as a resource to store encoded message data. In the expanded view of field 218, it is shown in FIG. 2, field 218 can include a protocol indicator 218A as well as a message 218B. Protocol indicator 218A can indicate the type of protocol that message 218B is to be associated with. For example, protocol indicator 218A may be a set of bits, wherein the various values of the bits map to different protocols. For example, "000" may correspond to the SIP protocol, "001" may correspond to the QSP protocol, etc. In this way, three bits could be used to encode eight different types of protocols, four bits 16, five bits 32, etc.

The remaining bits can be used to compose message 218B. For example, each of the messages that are listed in payload 214 could be mapped to a message that is indicated by message data 220.

The table below shows only one example of how payload-type messages could be mapped according to bit streams stored in message portion 218B within header 212.

| String | Mapped Message |
| --- | --- |
| 000 ... 0001 | INVITE |
| 000 ... 0010 | 100 Trying |
| 000 ... 0100 | 180 Ringing |
| 000 ... 0101 | 200 OK |
| 000 ... 0110 | ACK |
| 000 ... 0111 | BYE |
| ... | etc. (possibly millions) |

In the illustrative embodiment shown below, a number of bits are reserved to encode various messages associated with a protocol. If nineteen bits are reserved to encode messages, then over 500,000 messages can be encoded. If seventeen bits are reserved, then over 130,000 messages could be encoded. Moreover, if protocol indicator 218A indicates a separate protocol for each range of message 218B encodings, then over 500,000 different messages could be encoded per protocol. Of course, if twenty bits were reserved to encode messages, then over a million messages could be encoded. In one embodiment, seventeen bits are reserved for field 218. In one embodiment, the "Flow label" field in the IP protocol Version 6 (IPv6) can be used to store payload data. But other portions of header 212 could be used in other settings consistent with an embodiment of the present invention. And other protocols besides variations of the IP protocol could be employed. In the case where the Flow Label field is used, and it all 20 bits are used to encode a message, an alternative field can be used to indicate the protocol, instead of cannibalizing bits from the Flow Label field. An illustrative alternative field that might be used to so indicate a protocol includes the "Traffic Class" portion. In the IPv6 header, it 8 bits. Of course it may be the case that still only 2 or 3 bits are reserved to indicate types of protocols. In the case where 3 bits are reserved, a total of 25 bits remain across the Flow Label field and the Traffic Class portion (not shown) to encode messages, then this would allow over 33 million messages to be encoded.

Figure 3:
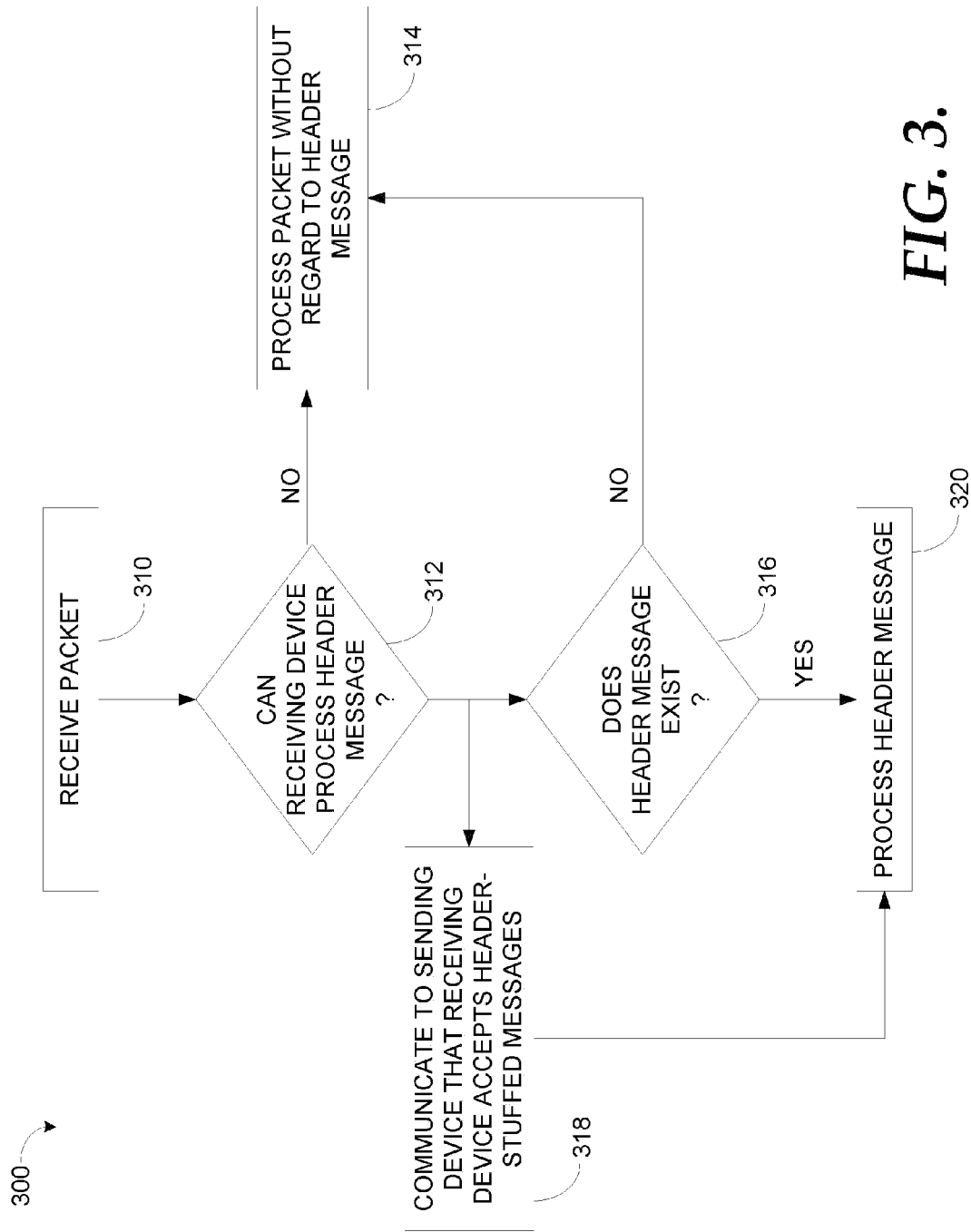
FIG. 3 depicts an illustrative method for communicating data according to an embodiment of the present invention.

Turning now to FIG. 3, an illustrative method for utilizing the data structure of FIG. 2 according to an embodiment of the present invention is provided in reference generally by the numeral 300. The steps of FIG. 3 are illustrative in nature and should not be construed as limited to a particular order as shown. In one embodiment, a packet is received at a step 310. A determination is made at a step 312 as to whether a receiving device could process a header message of the type described with reference to FIG. 2. In another embodiment, determination step 312 is not actually made by a receiving device but instead is just a fact of reality. That is, either the receiving device can process field 218 or it cannot. If it cannot, then processing advances to step 314 whereby the packet is processed without regard to the data contained in field 218. This would end the process associated with processing an illustrative data packet.

But if the receiving device could process a message header 212, particularly in a field such as field 218, then processing advances to a step 316 in one embodiment, where a determination is made as to whether a header message exists. That is, a determination is made as to whether field 218 includes information to be processed. In one embodiment, this includes determining whether protocol indicator field 218A indicates a certain type of message (e.g. a protocol or other); if it does, then determining the protocol, and then based on the protocol determination, decoding message 218B, which may merely include translating the bits into a message, or mapping the encoding to a message.

In one embodiment of the present invention, if a receiving device can process a data structure such as that shown in FIG. 2, then a message can be sent back from the receiving device to the sending device to indicate such ability to interpret such packets so that future packets can be sent as headers only, with no payloads. This would reduce the size of packets sent, reduce the amount of bandwidth necessary to send packets that include payloads with the same amount of information, and increase throughput for packet transmissions.

If a header message did exist per step 316, then the header would be processed at a step 320, but if no header message existed, then the packet could be processed without regard to a header message at step 314. And although a line is not shown from decision diamond 316 to step 320, it could also be the case that if a header message does not exist, then the normal header is processed as in step 320.

Figure 4:
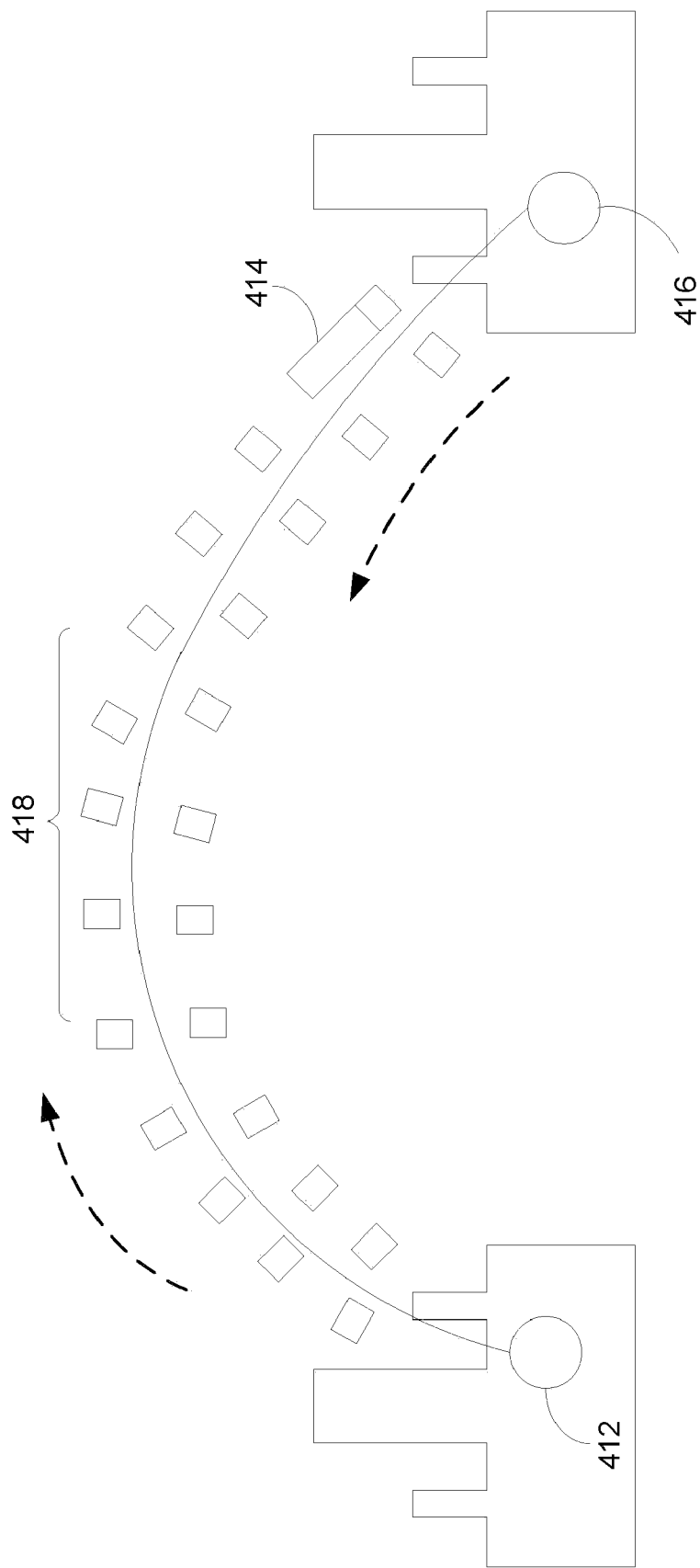
FIG. 4 depicts an illustrative method of communicating packets according to an embodiment of the present invention.

An illustrative operation of the present invention will now be described with reference to FIG. 4 with reference also to FIGS. 3 and 2. In FIG. 4, a sending device (meaning initially sending) 412 sends an initial packet 414 to an initially receiving device 416. Receiving device 416 begins to process the header of packet 414. In processing the header of packet 414, receiving device 416 determines that a field such as field 218 is populated with data. Consistent with message-type indicator 218A, receiving device 416 processes the header message 218B, and does not need to process payload portion 214. In this way, only headers need to be communicated between sending device 412 and receiving device 416 as shown. The headers are collectively referred to by numeral 418, and illustrate that payload portion, such as portion 214, no longer needs to be communicated between devices 412 and 416. Instead, the bandwidth of the communications channel between the two devices can be allocated toward communicating the smaller amounts of information; namely, just the headers of what would otherwise be headers and payloads together. This can speed communications between the two devices and/or allow a greater number of packets to be communicated between the devices in the same amount of time as would otherwise be spent sending packets including both headers and payloads.

The aforementioned embodiments are not meant to be exhaustive. There are a variety of different ways that the data structures described could be utilized to enhance data communications. For example, instead of actually decoding message-type indicator 218A, a receiving device could be configured to assume a default message type. In this way, message 218B could be decoded by default. For example, assuming communication was to be made in the SIP protocol. A SIP message could be encoded in field 218B and no message-type indicator in field 218A. But this would still be placing messaging information in the header. A receive device would assume that it is a SIP message and then simply decode the message. This would also allow for a larger number of messages to be encoded (by reducing the number of bits reserved to indicate the type of message in field 218A).

Further, all of the messaging information that would normally make up payload 214 does not need to be placed into field 218. That is, message portion 218B may include only one or a few commands (collectively coded), and the payload section 214 can pickup data where message portion 218B left off.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. For example,: dynamically generated signaling information may be appended to the header portion by virtue of including the same in payload portion 214. Messages exceeding the flow label size may similarly extend into payload portion 214 of the packet. Not all steps listed in the various figures need be carried out in the specific order described.

The invention claimed is:

1. A memory for storing computer-executable instructions that, when executed by a sending device, cause a data structure to be sent from said sending device, the data structure comprising: a data packet comprising a header and a payload, wherein part of the header includes first and second data portions; wherein the first data portion indicates a type of message encoded in the second data portion; wherein the second data portion includes message data; wherein the message data includes signaling information such that signaling information that would otherwise be included in the payload is included in the header; and wherein information making up the second data portion is replicated in the payload, thereby allowing receiving devices that cannot interpret the second data portion of the header to be able to interpret the information making up the second data portion by processing the payload.

2. The memory of claim 1, wherein the first and second data portions include at least some of a set of bits reserved for a flow label of the header of the packet according to the version of the Internet Protocol.

3. The memory of claim 1, wherein the first and second data portions include at least some of a set of bits reserved for a flow label and for a traffic class of the header of the packet according to the version of the Internet Protocol.

4. The memory of claim 2, wherein the version of the Internet Protocol includes the sixth version (IPv6).

* * * * *